US006658621B1

(12) United States Patent
Jamil et al.

(10) Patent No.: US 6,658,621 B1
(45) Date of Patent: Dec. 2, 2003

(54) SYSTEM AND METHOD FOR SILENT DATA CORRUPTION PREVENTION DUE TO NEXT INSTRUCTION POINTER CORRUPTION BY SOFT ERRORS

(75) Inventors: Sujat Jamil, Chandler, AZ (US); Hang T. Nguyen, Tempe, AZ (US); Andres Rabago, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 486 days.

(21) Appl. No.: 09/608,933

(22) Filed: Jun. 30, 2000

(51) Int. Cl.[7] ............................................. G11C 29/00
(52) U.S. Cl. ...................... 714/805; 714/803; 714/11; 712/34; 712/42
(58) Field of Search ................................ 714/803, 800, 714/801, 802, 804, 805, 806, 11, 6, 15, 24, 54, 53; 712/34, 42

(56) References Cited

U.S. PATENT DOCUMENTS 4,884,273 A * 11/1989 Caprasse .................... 714/803
5,453,999 A * 9/1995 Michaelson et al. ........ 714/805
5,504,859 A * 4/1996 Gustafson et al. ............ 714/11
5,613,143 A * 3/1997 Shimokawa ................. 712/42

* cited by examiner

*Primary Examiner*—Emmanuel L. Moise
(74) *Attorney, Agent, or Firm*—Kenyon & Kenyon

(57) ABSTRACT

A system and method for checking and correcting soft errors in a next instruction pointer is described. In one embodiment, a parity bit is generated for a next instruction pointer that is produced in a front end of a processor. The next instruction pointer and the parity bit are staged from the front end of the processor to a back end of the processor. Another next instruction pointer is generated in the back end of the processor when an instruction corresponding to the next instruction pointer generated in the front end executes. The next instruction pointer generated in the back end is also parity protected. The next instruction pointer generated in the front end is checked for a parity error. The next instruction pointer generated in the back end is also checked for the parity error. Finally, both next instruction pointers are compared to determine if both are equal. Based on whether the next instruction pointer generated in the front end has the parity error, whether the next instruction pointer generated in the back end has the parity error, and whether both next instruction pointers are equal, a control logic generates an exception or flushes a pipeline in the processor and fetches instructions using the next instruction pointer generated in the back end.

23 Claims, 8 Drawing Sheets

SYSTEM AND METHOD FOR SILENT DATA CORRUPTION PREVENTION DUE TO NEXT INSTRUCTION POINTER CORRUPTION BY SOFT ERRORS

BACKGROUND OF THE INVENTION

I. Field of the Invention

This invention relates generally to computer technology, and more particularly, to improving processor accuracy and reliability in a computer system.

II. Background Information

Early processors generally processed instructions one at a time. To improve efficiency, processor designers overlapped the operations of fetch, decode, and execute logic stages such that the processor operated on several instructions simultaneously. At each clock tick the results of each processing stage are passed to the following processing stage. Processors that use the technique of overlapping the fetch, decode, execute, and writeback stages are known as "pipelined" processors.

In order for a pipelined processor to operate efficiently, an instruction fetch unit at the head of the pipeline must continually provide the pipeline with a stream of instructions. However, conditional branch instructions within an instruction stream prevent the instruction fetch unit from fetching subsequent instructions until the branch condition is resolved. In a pipelined processor, the branch condition will not be resolved until the branch instruction reaches an instruction execution stage further down the pipeline. The instruction fetch unit must stall since the branch condition is unresolved at the instruction fetch stage and therefore the instruction fetch unit does not know which instructions to fetch next.

To alleviate this problem, many pipelined processors use branch prediction mechanisms that predict the outcome of branch instructions within an instruction stream. The instruction fetch unit uses the branch predictions to fetch subsequent instructions.

When the branch prediction mechanism mispredicts a branch, an instruction execution unit further down the pipeline eventually detects the branch misprediction. After the instruction execution unit detects a branch misprediction, the instructions that should not have been fetched are flushed out (i.e., removed from the pipeline) of the processor pipeline and program execution resumes along the corrected instruction path. To properly resume execution along the correct path, the processor must obtain the address of the instruction that should have been executed after the branch instruction.

If a branch instruction is taken, the address of the next instruction to be executed after the branch instruction is the target address of the branch instruction. If this branch instruction is incorrectly predicted as not taken, after the correct target address of the branch target is evaluated by completing the execution of the branch instruction, the processor will flush the processor pipeline and resume execution along the correct instruction path by fetching the instruction at the branch instruction's target address. This procedure is relatively simple since the target address is usually specified by the branch instruction and its associated operand.

On the other hand, if a branch instruction is not taken, the address of the next instruction to be executed after the branch instruction is the address of the instruction located sequentially after the branch instruction. By executing the branch instruction, this next sequential instruction address is evaluated. Again, if a misprediction is detected, the pipeline is flushed, and instruction fetch is resumed from this next sequential instruction address.

Between the different stages of the pipeline, latches may be used to store and transfer data between the different stages of the pipeline. As data is transferred from one stage to another, soft errors may occur in the latches. Soft errors in data storage elements, such as latches and memory cells occur when incident radiation charges or discharges the storage element thereby flipping its binary state. Soft errors are increasingly a concern with smaller scale fabrication processes as the size, and hence the capacitance of the storage elements get smaller and easier to disturb by incident radiation. While in the past soft errors were statistically significant only for large and dense storage structures like cache memories, with these smaller feature processes, soft errors are increasingly becoming a concern for pipeline latches as well, particularly wide (multi-bit) datapath latches, where probability of soft errors is most significant. When soft-errors silently corrupt data in a program, the program continues execution undetected other than producing the wrong results.

This Silent Data Corruption ("SDC") is not desirable in mission critical applications such as commercial transaction server applications, where wrong results can have broad reaching implications. For this reason, at the very minimum, it is imperative that soft errors become detected when they occur, so at least the application can be terminated, and any data corruption detected and reported. A preferable option is on finding the error being able to correct it and seamlessly continue execution of the application. There is greater opportunity for correction by the processor hardware than by the system software due to the finer information granularity visible to the hardware.

Modern, high performance processors often have to make tradeoffs in terms of transistor count and die area on what features to add for improving performance and what to add for improving reliability. While both is desired, performance is usually given higher priority. Also, the processor should be optimized for the frequent case, i.e., when no soft errors occur. Therefore, the difficulty in processor design is to incorporate soft error checking and correcting mechanisms without decreasing the performance of the processor by adding more devices thus taking away the available area for performance features, adding more pipeline stages, or lowering its frequency.

For the foregoing reasons, there is a need to detect and correct soft errors such that the soft errors are detected and corrected without hindering processor performance and area.

DETAILED DESCRIPTION

Figure 1:
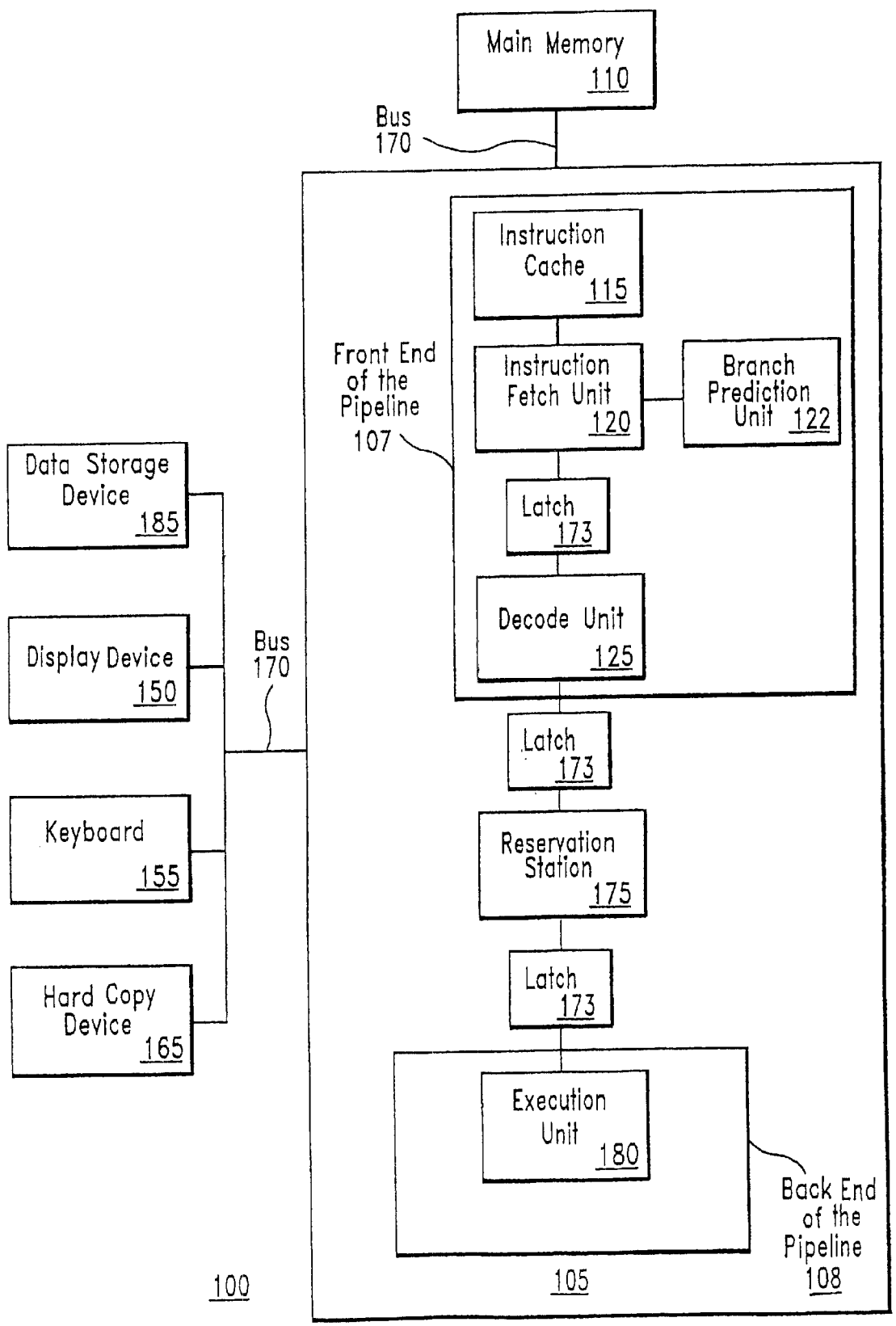
FIG. 1 shows a block diagram of a computer system according to one embodiment of the present invention.

A processor uses addresses to locate data in memory. An instruction pointer ("IP"), also known as program counter ("PC"), is the memory address of the executing instruction. It is used to fetch the instruction from internal cache memory or main memory. It is also used to index into branch prediction structures for generating subsequent IPs. Also, it is used for calculating branch targets for IP relative branch instructions. Finally, the IP is also used to tag and track an executing instruction for exceptions and other performance monitoring and debug support.

The next instruction pointer ("NIP") is the memory address of the next instruction to be fetched for execution. Unless the current instruction is a branch, the NIP is simply the current IP incremented by one, or some other fixed quantity. If the current instruction is in fact a branch, prior art processors have sophisticated branch prediction mechanisms to predict the NIP. For branches, the validity of the NIP is not known until the branch executes, and has been resolved, i.e., the direction (taken/not taken) and the target IP of the branch is evaluated. The true NIP, as determined after execution of the branch instruction, is compared with the predicted NIP and all subsequent instructions are flushed if they mismatch, and instructions are fetched from the NIP obtained after execution of the branch instruction. For non-branch instructions, since the control flow is known to be sequential, this NIP validation is not done.

A corrupted NIP can lead to the wrong instruction being fetched and executed with the incorrect architectural side effects, such as registers and main memory being updated in a manner not per program specification, hence resulting in SDC. With modern high frequency, deeply pipelined processors, there are typically many pipeline stages the NIP stages through. This multi-stage design implies multiple wide NIP latches (a latch is a storage device) which are susceptible to soft errors. In prior art processors, the NIP is not protected nor checked for soft errors.

In one embodiment of the present invention, the NIP as it stages from the front end of the processor to the back end of the processor is protected by a parity bit. In other words, a parity bit is generated for the NIP in the front end and this bit is staged along with NIP through all the pipeline latches NIP stages through. At the point of usage (i.e., the comparison of the NIP generated in the front end with the NIP generated in the back end), the NIP generated in the front end is checked for a parity error. Similarly, the datapath latches used for the generation of the NIP in the back end is also parity protected. The NIP generated in the back end is also checked for a parity error at the point of usage. Finally, the NIP generated in the front end and the NIP generated in the back end are compared for all instructions, and not just branches. For non-branch instructions, in the case of no soft errors, the NIP generated in the front end would equal the NIP generated in the back end.

The comparison of NIPs for all instructions does not require any additional hardware. In prior art processors, the back end would typically generate the next sequential IP, whether or not the current instruction is a branch instruction, to handle the situation when a branch is not taken and falls through to the next sequential IP. Also, typically the NIP comparison would also always happen, with the result of the comparison being used only on branch instructions.

This embodiment of the present invention detects all single-bit soft-errors, corrects many of the single-bit soft errors, and detects some of the double-bit errors using existing branch resolution hardware and adding only simple parity logic. The error checking and possible correcting is done at a lower transistor count cost and a lower critical timing path impact than traditional schemes like Hamming code based error-correcting code, which are both transistor count costly and relatively slow.

FIG. 1 shows a block diagram of a computer system 100 according to one embodiment of the present invention. In this embodiment, computer system 100 includes a processor 105 that executes instructions and processes information. Computer system 100 further includes a bus 170 for communicating information between processor 105 and the components of computer system 100. A main memory 110 is coupled to bus 170 for dynamically storing information and instructions to be executed by processor 105. Main memory 110 also may be used for storing temporary variables or other intermediate information during execution of instructions by processor 105. Computer system 100 also includes a data storage device 185 that is coupled to bus 170. Data storage device 185 is used to statically store data. Data storage device 185 may be a magnetic disk or optical disk and its corresponding disk drive.

Computer system 100 includes a display device 150 that is coupled to bus 170. Display device 150 is used for displaying information to a user of computer system 100 and may include a cathode ray tube ("CRT") or liquid crystal display ("LCD"). Computer system 100 also includes a keyboard 155. Keyboard 155 is used for inputting information and command selections to processor 105 and is coupled to bus 170. Computer system 100 includes a hard copy device 165 which may be used for printing instructions, data, or other information on a medium such as paper or film. Hard copy device 165 is coupled to bus 170.

FIG. 1 also includes the pipeline units of processor 105. Instructions are initially fetched from one of the memory devices (e.g., main memory 110) into an instruction cache 115. Instruction cache 115 is a high-speed cache memory for storing commonly or recently accessed instructions.

A branch prediction unit 122, in general, generates branch predictions for the branch instructions, directs an instruction fetch unit 120 to retrieve the program instructions in an order corresponding to the branch predictions, and redirects instruction fetch unit 120 based on a branch misprediction. Branch prediction unit 122 performs a branch prediction whenever a branch instruction is fetched. If a branch prediction was incorrect, the instructions subsequent to the mispredicted branch that have entered the instruction processing pipeline are flushed, and the correct instructions are fetched from instruction cache 115. In such situations, results of instructions in the original program sequence which occur after the mispredicted branch instruction are discarded.

Instruction fetch unit 120 is coupled to instruction cache 115 and branch prediction unit 122. Instruction fetch unit 120 retrieves program instructions from instruction cache 115. Which program instruction is retrieved is determined by whether a control flow instruction such as a branch is involved. If the branch instruction is not involved then instructions are fetched sequentially from instruction cache 115. However, a branch instruction causes instructions to be fetched in a non-sequential manner with branch prediction unit 122 providing to instruction fetch unit 120 the address for the next instruction to be fetched from instruction cache 115.

A decode unit 125 decodes each instruction into a set of micro-operations (uops). A reservation station 175 schedules instructions (removes data and structural hazards) and controls when an instruction can begin executing. An execution unit 180 executes logical and arithmetic instructions as well as other well known execution functions. Execution unit 180 may include an integer execution unit, a floating point unit, and a memory execution unit.

A latch 173 is used to store and retrieve instructions. Latch 173 may be used between pipeline stages to store and transfer instructions between the pipeline stages (a pipeline stage may be for example, the decoding stage, which is performed by decode unit 125). In the one embodiment of the present invention, latch 173 connects the following pipeline stages: (1) instruction fetch unit 120 and decode unit 125; (2) decode unit 125 and reservation station 175; and (3) reservation station 175 and execution unit 180.

When sequencing instructions through a pipelined processor, most processors have an instruction fetch engine, which comprises the first few stages of the processor pipeline (e.g., the fetch and decode stages as performed by instruction fetch unit 120 and decode unit 125 respectively). The instruction fetch engine is commonly called a front-end of the pipeline ("FE") 107. An instruction execution engine, which comprises the last stages of the pipeline (e.g., the execute stage as performed by execution unit 180), is commonly called a back-end of the pipeline ("BE") 108. Other portions, such as the scheduling stage, as represented by reservation station 175, are not encompassed by FE 107 or BE 108.

Figure 2:
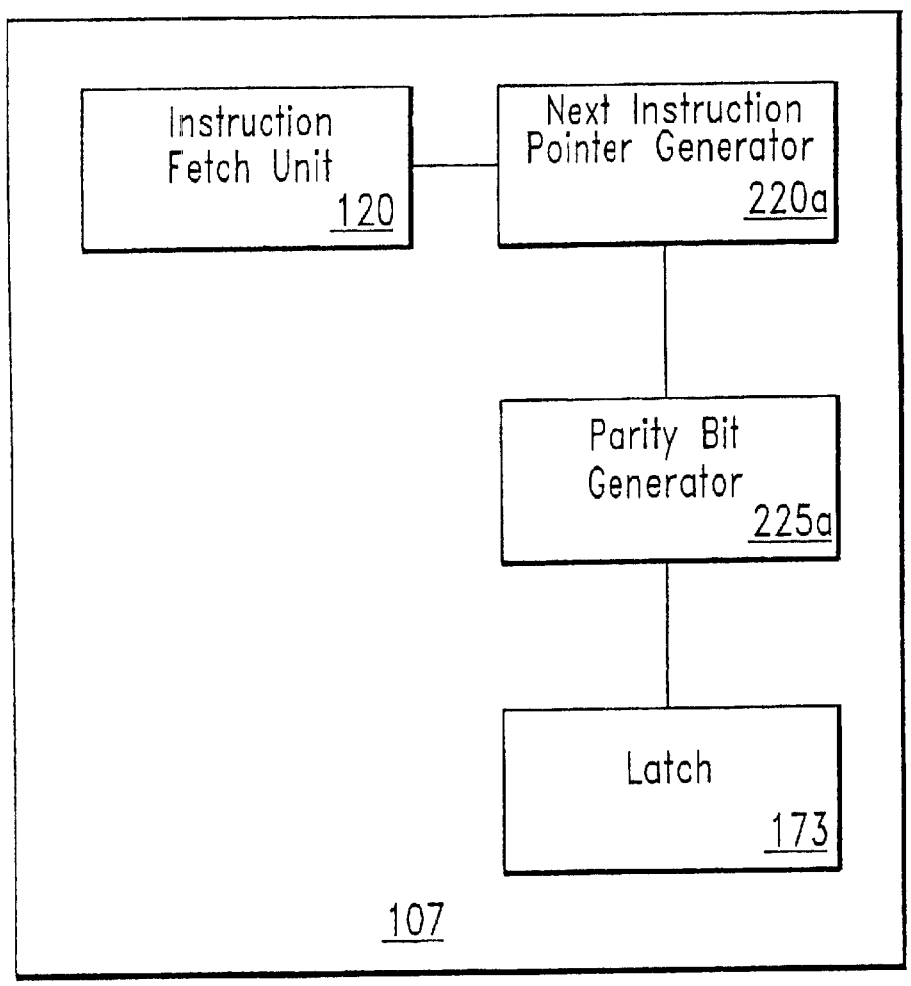
FIG. 2 shows a block diagram of a front end of a processor according to one embodiment of the present invention.

FIG. 2 shows a block diagram of FE 107 according to one embodiment of the present invention. In this embodiment, FE 107, among other functions, generates a NIP. FE 107 includes a next instruction pointer generator 220*a* which produces the NIP. If a non-branch instruction is being processed, next instruction pointer generator 220*a* calculates the NIP by incrementing by one or other fixed quantity the address of the current instruction. If a branch instruction is being processed, then branch prediction unit 122 provides the NIP (this NIP is predicted by the branch prediction unit 122 to be the address of the next instruction to be fetched) to next instruction pointer generator 220*a*. Next instruction pointer generator 220*a* sends the generated NIP to instruction fetch unit 120 so that it knows the address in memory of the next instruction to fetch.

In this embodiment, a parity bit generator 225*a* produces a parity bit for an address such as the NIP. A parity bit is generated for the NIP in FE 107 and this bit is appended to the NIP and is staged along with the NIP through all the pipeline latches that the NIP stages through. The parity for the NIP may be even parity or odd parity. The parity of a word (either even or odd ) is determined by the number of ones it includes. For example, 1010101111 and 10000010 have even parity, and 100000000 and 10101011 have odd parity. To use parity for error detection, a parity bit is appended to each NIP. The parity bit is chosen to force all NIPs to have the same parity, either even or odd. The NIP and the parity bit are sent to latch 173 and staged through the pipeline toward BE 108.

Figure 3:
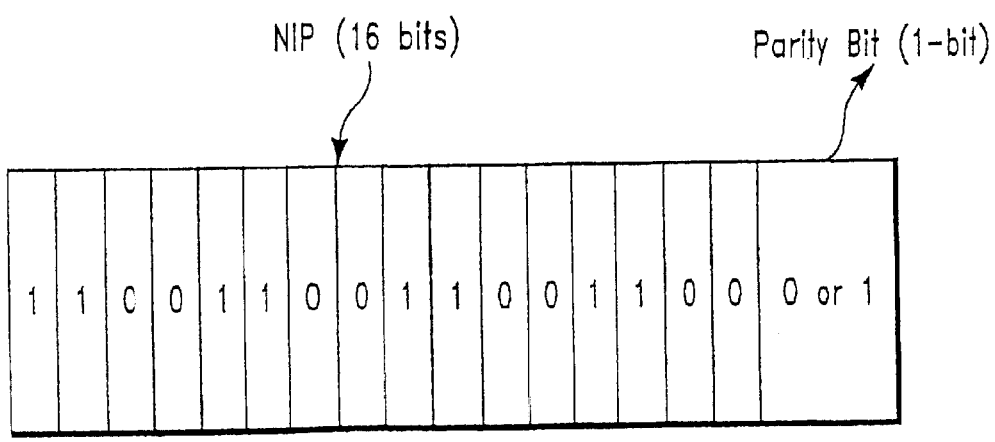
FIG. 3 shows an example of a parity bit appended to the next instruction pointer according to one embodiment of the present invention.

FIG. 3 shows an example of a parity bit appended to the NIP according to one embodiment of the present invention.

In FIG. 3, it is assumed that the NIP is represented by 16-bits. The NIP in FIG. 3 has an even number of ones. If odd parity is used, then the 1-bit parity bit in FIG. 3 would have the value "1" resulting in an odd number of ones. If even parity is used, then the 1-bit parity bit in FIG. 3 would have the value "0" resulting in an even number of ones.

A parity error occurs, for example, if even parity is used and the set of received bits has an odd number of "1"s, or if odd parity is used and the set of received bits has an even number of "1"s.

The front end of prior art processors include the next instruction pointer generator 220*a*, however, they do not include parity bit generator 225*a*. By adding only the parity bit generator 225*a*, this embodiment of the present invention performs the soft error checking and correcting using existing components and minimizes the amount of additional components used.

Figure 4:
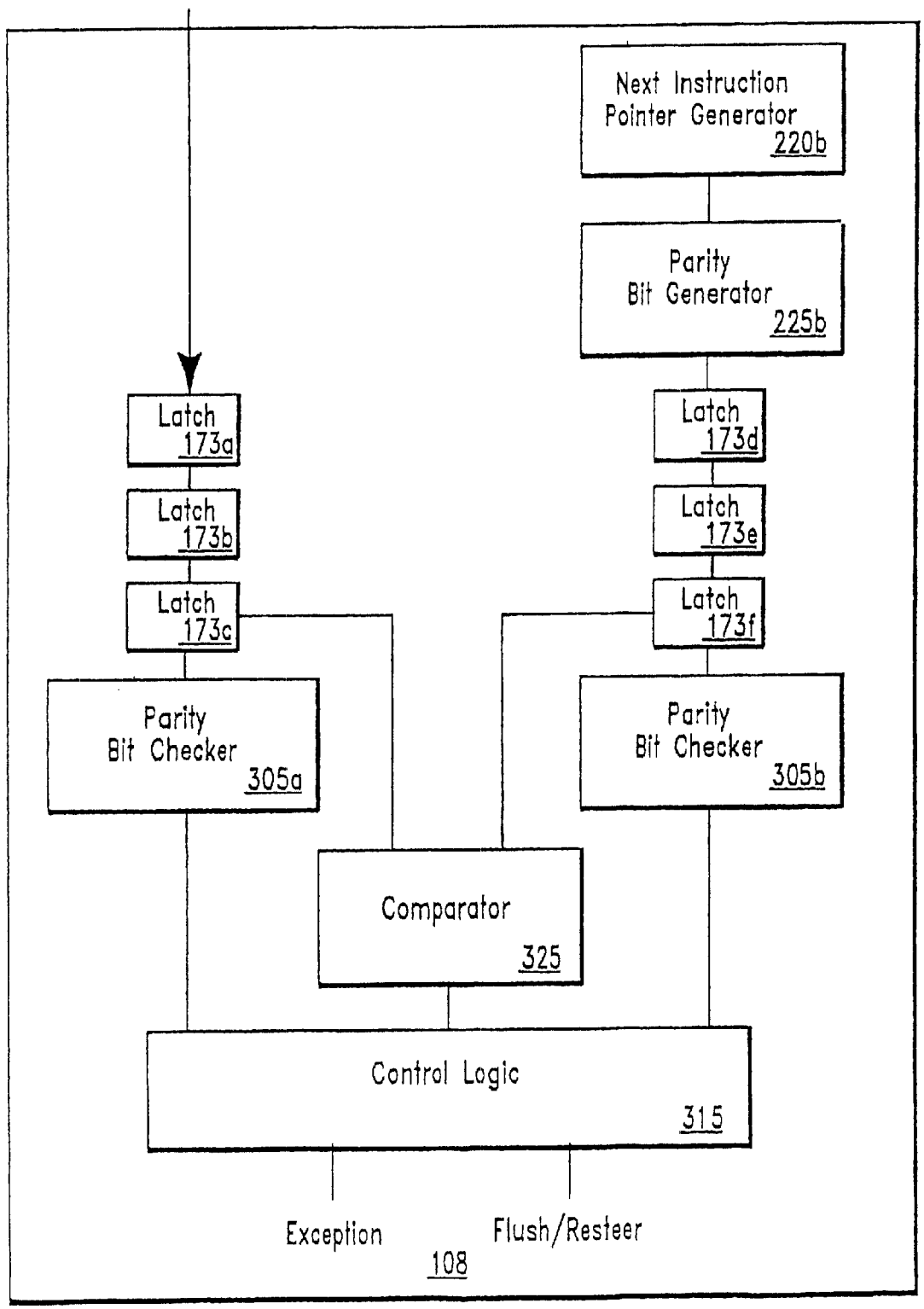
FIG. 4 shows a block diagram of a back end of the processor according to one embodiment of the present invention.

FIG. 4 shows a block diagram of BE 108 according to one embodiment of the present invention. In this embodiment, BE 108 includes a next instruction pointer generator 220*b* which produces a NIP. If a non-branch instruction is being processed, next instruction pointer generator 220*b* produces the NIP by incrementing by one or other fixed quantity the address of the current instruction. In the case of a branch instruction, that branch instruction is executed by execution unit 180 to determine if the branch is taken. If the branch is taken, then next instruction pointer generator 220*b* gets the NIP from the instruction itself because the NIP is provided by the target address of the instruction. If the branch is not taken, then the NIP is the address of the current instruction incremented by one or some other fixed quantity. BE 108 also includes a parity bit generator 225*b* which produces a parity bit that is appended to the NIP created by next instruction pointer generator 220*b*.

BE 108 includes a stream of latches 173*a–c* that stages the NIP generated in FE 107 and its parity bit. BE 108 also includes a stream of latches 173*d–f* that stages the NIP generated in BE 108 and its parity bit. The latches 173*a–f* are used in order to wait for other operations to complete, such as waiting for the determination of whether a branch instruction was taken.

BE 108 includes a comparator 325 that compares the NIP generated by next instruction pointer generator 220*a* (i.e., generated in FE 107) and the NIP generated by next instruction pointer generator 220*b* (i.e., generated in BE 108). The NIP generated in FE 107 may be obtained from latch 173*c*. The NIP generated in BE 108 may be obtained from latch 173*f*. The comparison of the NIPs is done for all instructions (i.e., the comparison is done whether or not the instruction is a branch instruction). The result of the comparison (i.e., whether the NIP generated in FE 107 equals the NIP generated in BE 108) is sent to a control logic 315.

BE 108 includes a parity bit checker 305*a* that checks to determine if a parity error occurred in the NIP generated in FE 107. A parity error here indicates that a parity error occurred in the latches between the generation of the NIP in FE 107 and the error checking performed here by parity bit checker 305*a*. Parity bit checker 305*a* gets the NIP generated in FE 107 and its corresponding parity bit from latch 173*c*. The result of this parity check is sent to a control logic 315. BE 108 also includes a parity bit checker 305*b* which checks to determine if a parity error occurred in the NIP generated in BE 108. A parity error here indicates that a parity error occurred in the stream of latches 173*d–f*. Parity bit checker 305*b* may get the NIP generated in BE 108 and its corresponding parity bit from latch 173*f*. The result of this parity check is sent to control logic 315.

Based on whether parity bit checker 305a finds a parity error in the NIP generated in FE 107, whether parity bit checker 305b finds a parity error in the NIP generated in BE 108, and whether comparator 325 finds that the NIP generated in FE 107 and the NIP generated in BE 108 are equal, control logic 315 instructs processor 105 on an appropriate action. The action may be any of the following: generate an exception, generate a flush/resteer signal, or take no action. An exception causes processor 105 to stop executing and run an exception handler to process the error. A flush/resteer signal instructs processor 105 to remove instructions from the pipeline and to fetch instructions from a specified IP. If an error in the NIP did not occur or that error is correctable, then control logic 315 takes no action.

The back end of prior art processors include next instruction pointer generator 220b, comparator 325, and control logic 315, however, they do not include parity bit checker 305a, parity bit generator 225b, and parity bit checker 305b. The back end of prior art processors use next instruction pointer generator 220b, comparator 325, and control logic 315 to determine the correctness of branch predictions and to handle branch mispredictions. By adding only parity bit checker 305a, parity bit generator 225b, and parity bit checker 305b, this embodiment of the present invention performs the soft error checking and correcting using existing components previously used to determine the correctness of branch predictions, and minimizes the amount of additional components used to perform the soft error checking and correcting.

Figure 5:
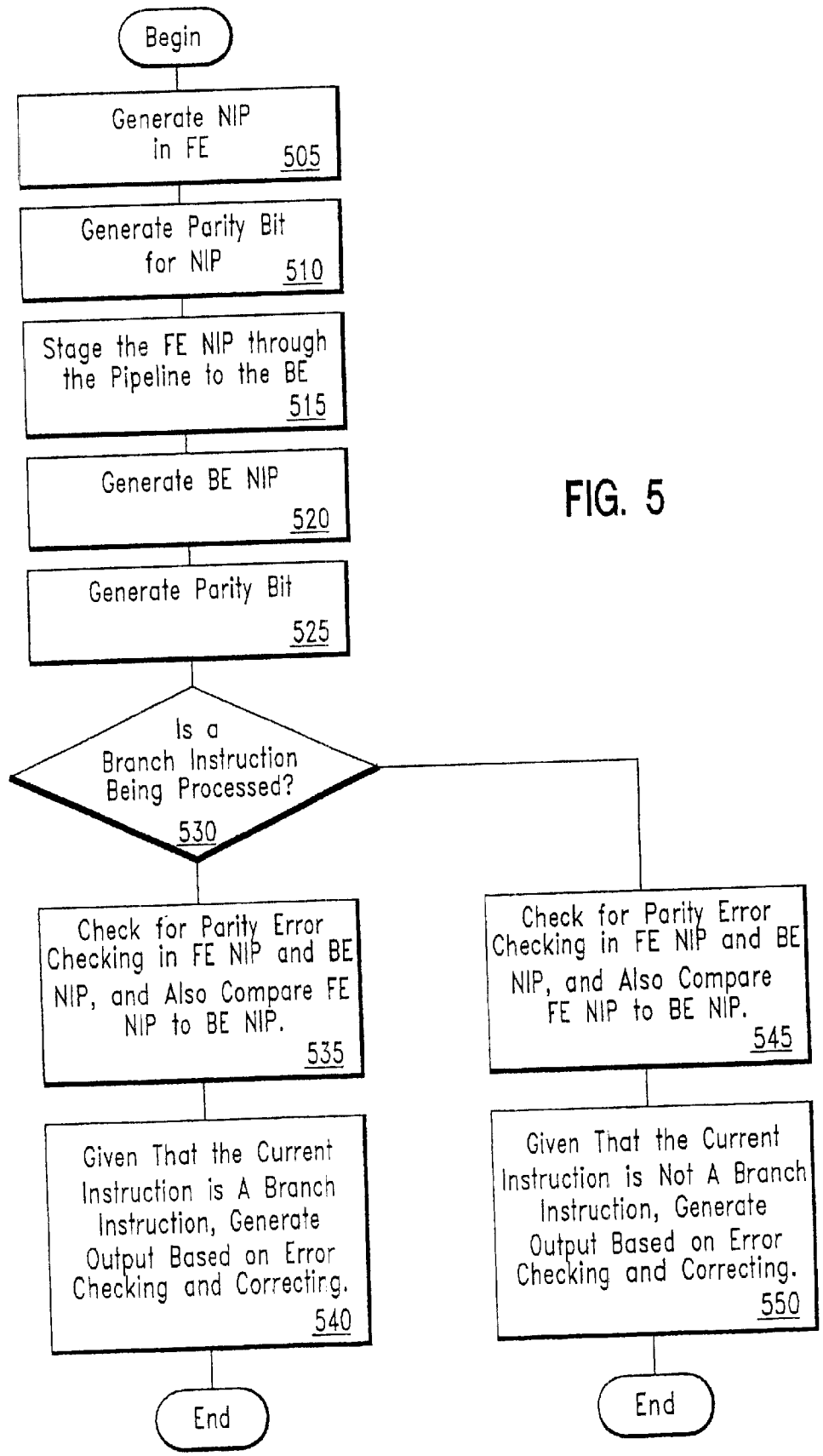
FIG. 5 shows a flowchart describing the process of checking and correcting soft errors according to one embodiment of the present invention.

FIG. 5 shows a flowchart describing the process of checking and correcting soft errors according to one embodiment of the present invention. In block 505, next instruction pointer generator 220a generates the NIP in FE 107. In block 510, parity bit generator 225a generates a parity bit for this NIP in FE 107. In block 515, the NIP along with the generated parity bit is staged through the pipeline toward BE 108. In block 520, next instruction pointer generator 220b generates the NIP in BE 108. In block 525, parity bit generator 225b generates the parity bit for the NIP generated in BE 108. In block 530, control logic 315 determines if a branch instruction is being processed. If a branch instruction is being processed, then in block 535, the devices in BE 108 perform parity error checking of the NIP generated both in FE 107 and in BE 108, and also compares these two NIPs. In block 540, control logic 315 generates output based on the error checking and correcting, and given that the current instruction being processed is not a branch instruction. Control logic 315 may output one of the following: a flush/resteer signal (signal to flush the pipeline and fetch instructions from a specific memory address), or an exception.

If a branch instruction is not being processed, then in block 545, the devices in BE 108 perform parity error checking of the NIP generated both in FE 107 and in BE 108, and also compares these two NIPs. In block 550, control logic 315 generates output based on the error checking and correcting, and given that the current instruction being processed is not a branch instruction. Control logic 315 may output one of the following: a flush/resteer signal, or an exception.

Figure 6A:
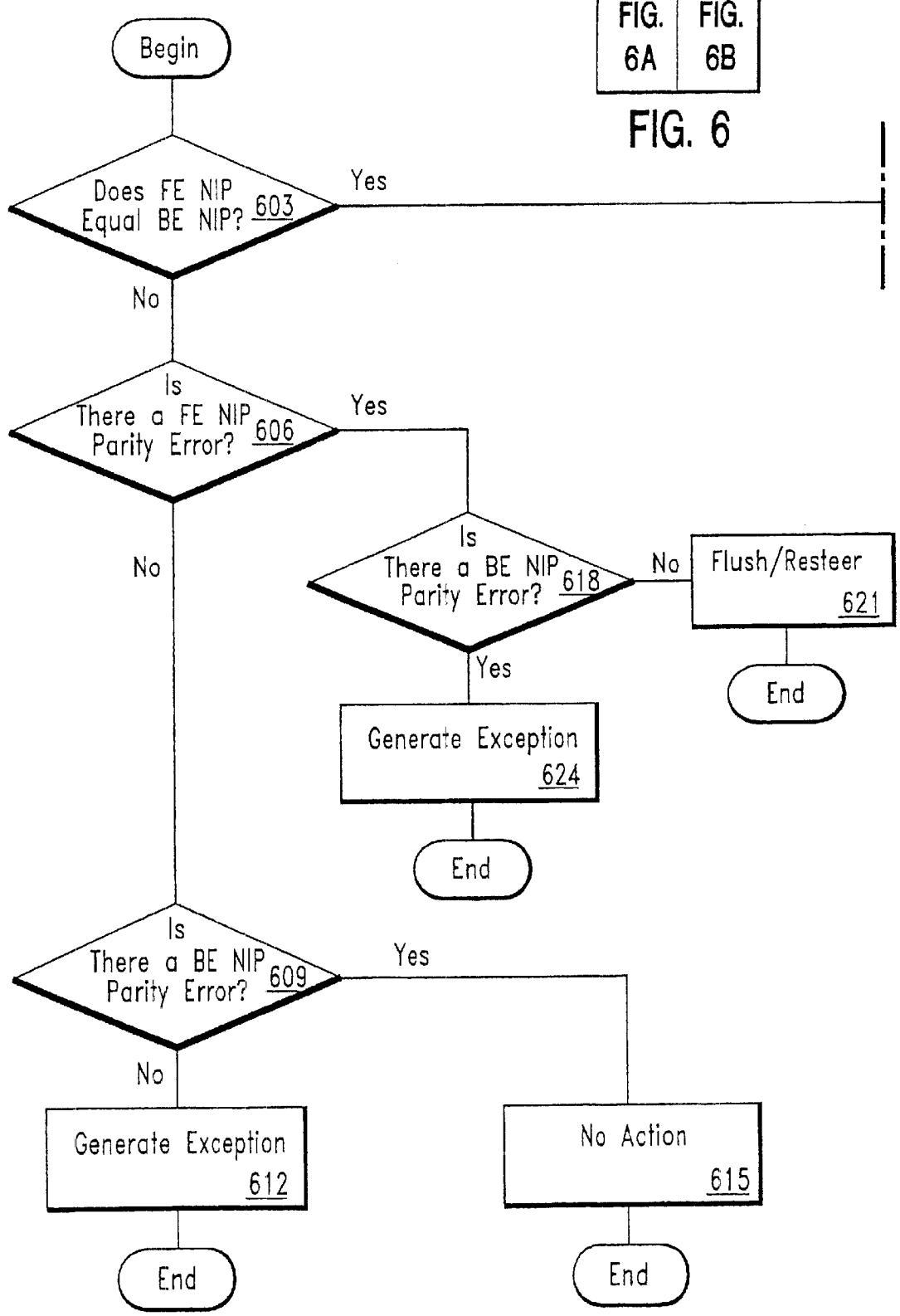
FIGS. 6A and 6B show a flowchart describing the process of checking and correcting soft errors for non-branch instruction execution according to one embodiment of the present invention.
Figure 6B:
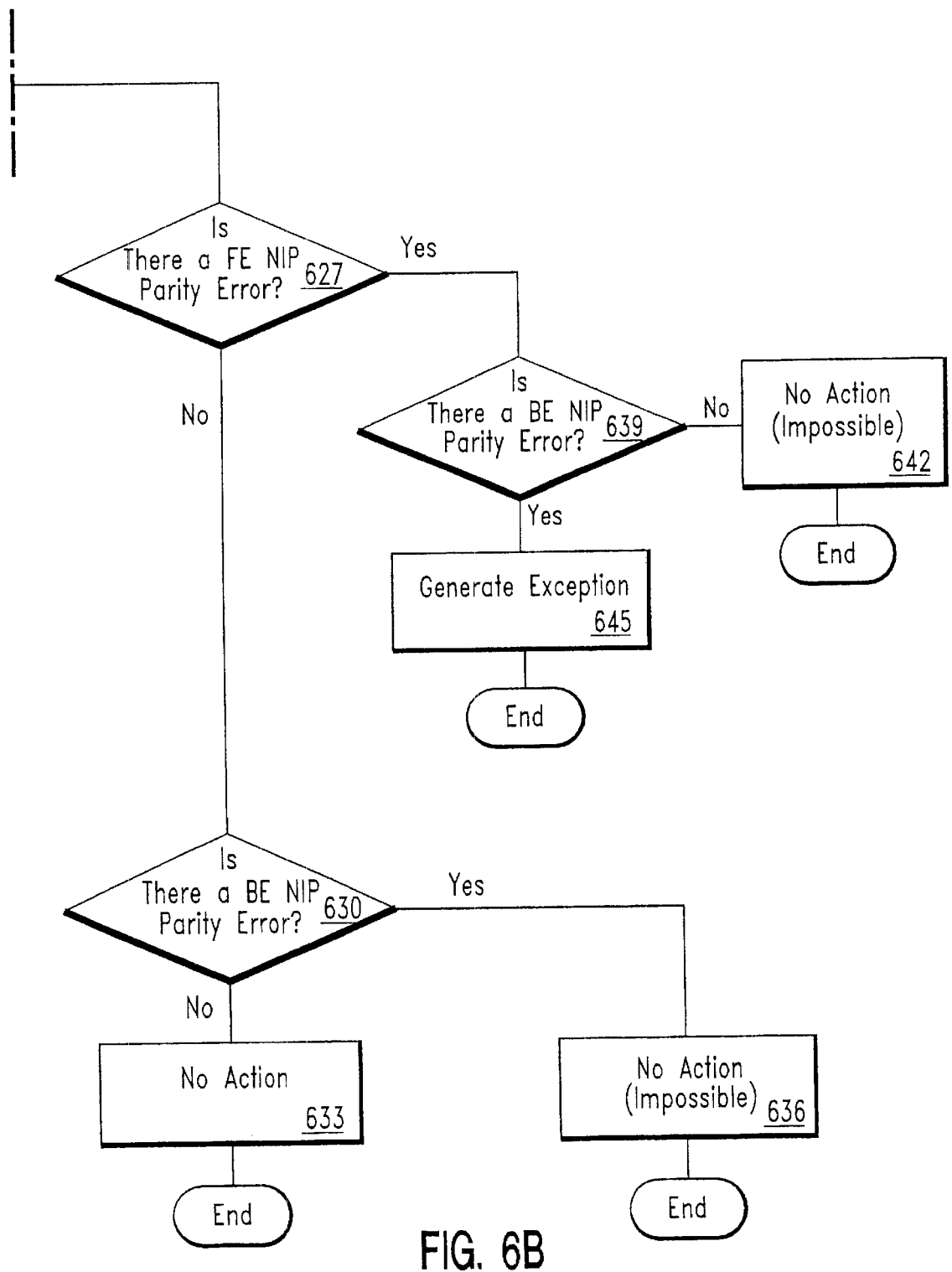

FIGS. 6A and 6B show a flowchart describing the process of checking and correcting soft errors for non-branch instruction execution according to one embodiment of the present invention. FIGS. 6A and 6B elaborate on blocks 545 and 550 of FIG. 5. In block 603, comparator 325 checks if the NIP generated in FE 107 equals the NIP generated in BE 108. If the NIP generated in FE 107 does not equal the NIP generated in BE 108, then in block 606, parity bit checker 305a checks if the NIP generated in FE 107 has a parity error. If the NIP generated in FE 107 does not have a parity error, then in block 609, parity bit checker 305b checks if the NIP generated in BE 108 has a parity error.

If the NIP generated in BE 108 does not have a parity error, then in block 612, control logic 315 generates an exception because a double bit error occurred. In this case, because the current instruction is not a branch instruction, the NIP generated in FE 107 should equal the NIP generated in BE 108. In this case, because a single bit error is not detected by either parity bit checker 305a nor parity bit checker 305b and the NIP generated in FE 107 does not equal the NIP generated in BE 108, a double bit error occurred in one or both of the NIPs and control logic 315 notifies processor 105 of this uncorrectable error in the NIPs by generating an exception. Here, double bit error detection is done with the use of only one parity bit (i.e., only one parity bit is added to each of the NIPs). If, however, the NIP generated in BE 108 does have a parity error, then in block 615, control logic 315 does not take any action because the NIP generated in BE 108 is ignored for non-branch instructions.

If the NIP generated in FE 107 does have a parity error, then in block 618, parity bit checker 305b determines if the NIP generated in BE 108 has a parity error. If the NIP generated in BE 108 does not have a parity error, then in block 621, the pipeline is flushed and instructions are fetched from the NIP generated in BE 108. Here, the NIP generated in FE 107 has a parity error but the NIP generated in BE 108 does not have a parity error, and thus control logic 315 sends a signal to flush the pipeline and begin fetching instructions from the NIP generated in BE 108. In this case, error correction is accomplished by adding only one bit to the NIP. If, however, the NIP generated in BE 108 does have a parity error, then in block 624, control logic 315 generates an exception to report the error to processor 105 because it cannot be corrected since both NIPs have a parity error.

If the NIP generated in FE 107 equals the NIP generated in BE 108, then in block 627, parity bit checker 305a checks if the NIP generated in FE 107 does have a parity error. If the NIP generated in FE 107 does not have a parity error, then in block 630, parity bit checker 305b checks if the NIP generated in BE 108 has a parity error.

If the NIP generated in BE 108 does not have a parity error, then in block 633, control logic 315 does not need to perform any action because this is the error-free case for a non-branch instruction (i.e., for a non-branch instruction, the NIP generated in FE 107 should equal the NIP generated in BE 108; in the error-free case, the NIP generated in FE 107 should equal the NIP generated in BE 108 and neither NIPs should have a parity error). The case where the NIP generated in BE 108 has a parity error is impossible because it is impossible for the NIP generated in FE 107 to equal the NIP generated in BE 108 and have a parity error only in one of the NIPs (an error in either of the NIPs will cause the two NIPs to be unequal). Thus, in block 636, control logic 315 performs no action in this case.

Figure 7A:
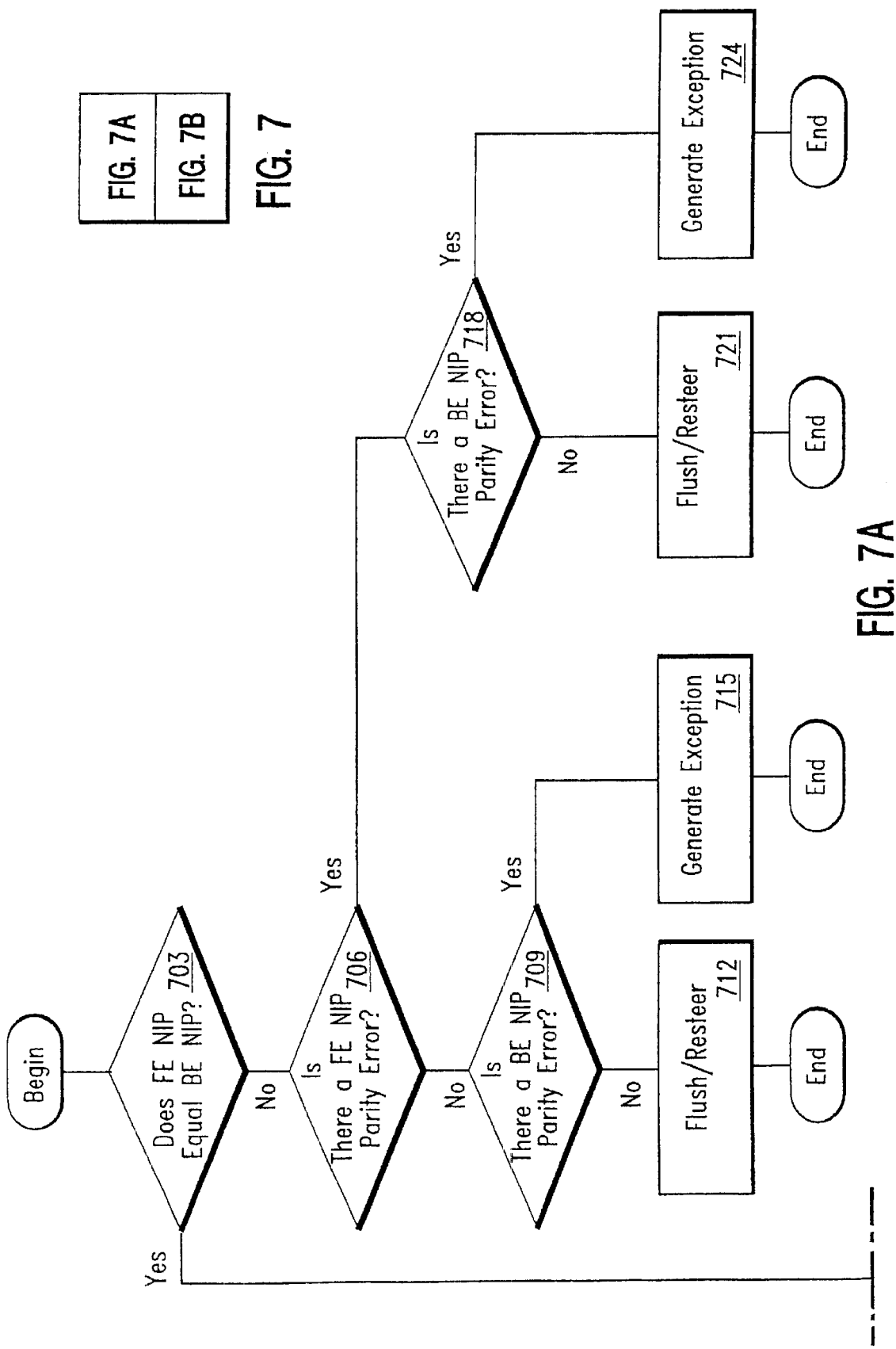
FIGS. 7A and 7B show a flowchart describing the process of checking and correcting soft errors for branch instruction execution according to one embodiment of the present invention.
Figure 7B:
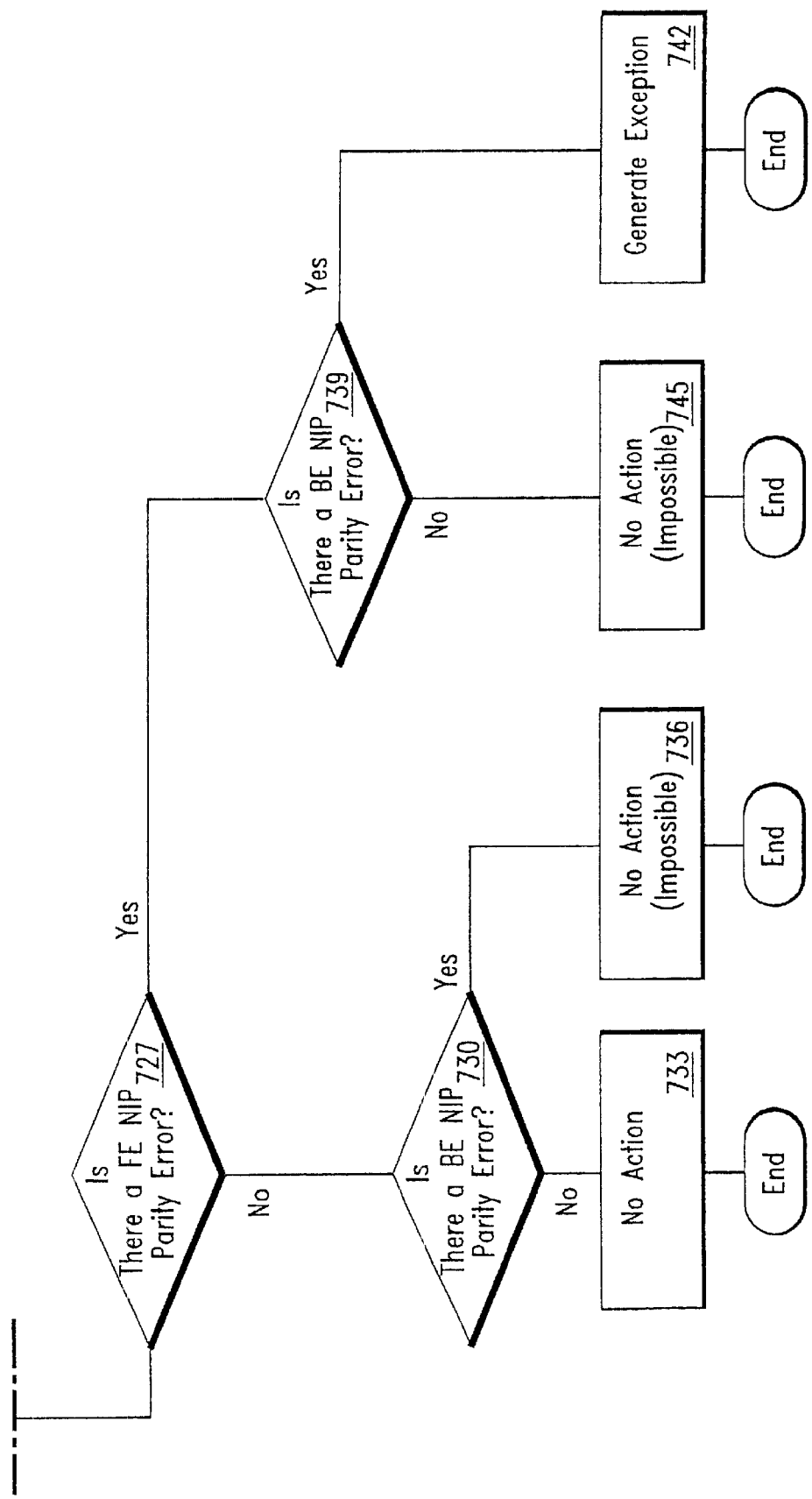

If the NIP generated in FE 107 does have a parity error, then in block 639, parity bit checker 305b determines if the NIP generated in BE 108 has a parity error. The case where the NIP generated in BE 108 has a parity error is impossible because it is impossible for the NIP generated in FE 107 to equal the NIP generated in BE 108 and have a parity error only in one of the NIPs. Therefore, in block 642, control logic 315 performs no action. If, however, the NIP generated in BE 108 has a parity error, then in block 645, control logic 315 generates an exception to report the error to processor 105 because it cannot be corrected since both NIPs have parity errors FIGS. 7A and 7B show a flowchart describing the process of checking and correcting soft errors for branch instruction execution according to one embodiment of the present invention. FIGS. 7A and 7B elaborate on blocks 535 and 540 of FIG. 5. In block 703, comparator 325 checks if the NIP generated in FE 107 equals the NIP generated in BE 108. If the NIP generated in FE 107 does not equal the NIP generated in BE 108, then in block 706, parity bit checker 305a checks if the NIP generated in FE 107 has a parity error. If the NIP generated in FE 107 does not have a parity error, then in block 709, parity bit checker 305b checks if the NIP generated in BE 108 has a parity error.

If the NIP generated in BE 108 does not have a parity error, then a branch misprediction occurs and as done by prior art processors when dealing with branch mispredictions, in block 712, processor 105 flushes the pipeline (i.e., removes the instructions currently in the pipeline and fetched from the mispredicted path) and directs instruction fetch unit 120 to fetch instructions from the NIP generated in BE 108. If, however, there is a parity error in the NIP generated in BE 108, then in block 715, control logic 315 generates an exception. Because the NIP generated in FE 107 is only a prediction (i.e., the current instruction being processed is a branch instruction) and the NIP generated in BE 108 has a parity error, the correct NIP is not known and processor 105 is notified of the parity error by generating the exception.

If the NIP generated in FE 107 does have a parity error, then in block 718, parity bit checker 305b determines if the NIP generated in BE 108 has a parity error. If the NIP generated in BE 108 does not have a parity error, then in block 721, the pipeline is flushed and instructions are fetched from the NIP generated in BE 108. Here, the NIP generated in BE 108 does not have a parity error and thus is correct, therefore, control logic 315 sends a signal to flush the pipeline (i.e., remove instructions fetched using the NIP which has a parity error) and begin fetching instructions from the NIP generated in BE 108 (i.e., fetch instructions from the NIP that is error-free). In this case, error correction is accomplished by adding only one bit to the NIP. If, however, the NIP generated in BE 108 does have a parity error, then in block 724, control logic 315 generates an exception to report the error to processor 105 because it cannot be corrected since both NIPs have a parity error.

If the NIP generated in FE 107 does equal the NIP generated in BE 108, then in block 727, parity bit checker 305a checks if the NIP generated in FE 107 does have a parity error. If the NIP generated in FE 107 does not have a parity error, then in block 730, parity bit checker 305b checks if the NIP generated in BE 108 has a parity error.

If the NIP generated in BE 108 does not have a parity error, then in block 733, control logic 315 does not need to perform any action because this is the error-free case for a branch instruction (i.e., for the branch instruction, the NIP prediction was correct and neither of the NIPs have a parity error). The case where the NIP generated in BE 108 has a parity error is impossible because it is impossible for the NIP generated in FE 107 to equal the NIP generated in BE 108 and have a parity error only in one of the NIPs (an error in only one of the NIPs will cause the two NIPs to be unequal). Thus, in this case, in block 736, control logic 315 performs no action.

If the NIP generated in FE 107 does have a parity error, then in block 739, parity bit checker 305b determines if the NIP generated in BE 108 has a parity error. The case where the NIP generated in BE 108 has a parity error is impossible because it is impossible for the NIP generated in FE 107 to equal the NIP generated in BE 108 and have a parity error only in one of the NIPs. Therefore, in block 745, control logic 315 performs no action. If, however, the NIP generated in BE 108 has a parity error, then in block 742, control logic 315 generates an exception to report the error to processor 105 because it cannot be corrected since both NIPs have a parity error. The following table lists the various cases of the flowcharts found in FIG. 6 and FIG. 7:

| Branch? | FE NIP equals BE NIP? | FE NIP Parity Error? | BE NIP Parity Error? | Status | Action |
|---------|-----------------------|----------------------|----------------------|--------|--------|
| N | N | N | N | Double bit error | Exception |
| N | N | N | Y | BE parity error | None |
| N | N | Y | N | FE parity error | Flush/resteer |
| N | N | Y | Y | BE and FE error | Exception |
| N | Y | N | N | No errors | None |
| N | Y | N | Y | Impossible | N/A |
| N | Y | Y | N | Impossible | N/A |
| N | Y | Y | Y | BE and FE error | Exception |
| Y | N | N | N | Branch misprediction (No error) | Flush/resteer |
| Y | N | N | Y | BE parity error | Exception |
| Y | N | Y | N | FE parity error | Flush/resteer |
| Y | N | Y | Y | BE and FE error | Exception |
| Y | Y | N | N | No errors | None |
| Y | Y | N | Y | Impossible | N/A |
| Y | Y | Y | N | Impossible | N/A |
| Y | Y | Y | Y | BE and FE error | Exception |

Using the one embodiment of the present invention, the following advantages are provided:
1. The NIP is protected from all SDC arising from single bit soft errors (where one bit of the NIP is changed) in either the NIP generated in FE 107 or BE 108 or both for all instructions.
2. The NIP is protected from SDC arising from double-bit errors on non-branch instructions when double bit error occurs in either the NIP generated in FE 107 or BE 108 or both such that the NIPs mismatch.
3. Errors in the NIP are corrected when it can be determined that there is only a parity error in the NIP generated in FE 107 (the underlined cases in the table), because control logic 315 flushes subsequent instructions and forces FE 107 to initiate instruction fetch from the NIP generated in BE 108.

In another embodiment of the present invention, multiple parity bits (rather than just one parity bit) may be used with the NIP. For example, one parity bit may be used to protect each byte of the NIP. In this embodiment, multiple parity bits are generated for each NIP and the multiple parity bits are used when checking for parity errors in the NIP. Here, parity bit generator 225a and parity bit generator 225b generate multiple parity bits for each NIP. In addition, parity bit checker 305a and parity bit checker 305b check multiple parity bits when checking for parity errors.

Although embodiments are specifically illustrated and described herein, it will be appreciated that modifications and variations of the present invention are covered by the above teachings and within the purview of the appended claims without departing from the spirit and intended scope of the invention.

What is claimed is:

1. A method for checking and correcting soft errors in a processor, comprising:
   generating a first parity bit for a first next instruction pointer;
   generating a second parity bit for a second next instruction pointer; and
   comparing the first and second next instruction pointers.

2. The method of claim 1, wherein the first parity bit is generated in a front end of the processor.

3. The method of claim 2, wherein the first next instruction pointer together with the first parity bit are staged through a pipeline in the processor.

4. The method of claim 2, wherein:
   the second next instruction pointer together with the second parity bit are staged through a pipeline in the processor.

5. A method for checking and correcting soft errors in a processor, comprising:
   generating a first parity bit for a first next instruction pointer;
   generating a second parity bit for a second next instruction pointer;
   checking for a parity error in the first next instruction pointer using the first parity bit, and in the second next instruction pointer using the second parity bit; and
   comparing the first next instruction pointer and the second next instruction pointer to determine if both are equal.

6. The method of claim 5, further comprising:
   generating an exception if at least one of
      the first next instruction pointer together with the first parity bit signal the parity error, and the second next instruction pointer together with the second parity bit signal the parity error,
      the first next instruction pointer together with the first parity bit do not signal the parity error, and the second next instruction pointer together with the second parity bit do not signal the parity error, and the first next instruction pointer does not equal the second next instruction pointer, and an instruction currently executing is not a branch instruction, and
      the first next instruction pointer together with the first parity bit do not signal the parity error, and the second next instruction pointer together with the second parity bit signal the parity error, and the first next instruction pointer does not equal the second next instruction pointer, and the instruction currently executing is the branch instruction.

7. The method of claim 6, further comprising:
   flushing a pipeline in the processor and fetching a set of instructions using the second next instruction pointer if at least one of
      the first next instruction pointer together with the first parity bit signal the parity error, and the second next instruction pointer together with the second parity bit do not signal the parity error, and the first next instruction pointer does not equal the second next instruction pointer, and
      the first next instruction pointer together with the first parity bit do not signal the parity error, and the second next instruction pointer together with the second parity bit do not signal the parity error, and the first next instruction pointer does not equal the second next instruction pointer, and the instruction currently executing is the branch instruction.

8. The method of claim 7 wherein a signal to flush the pipeline and fetch the set of instructions using the second next instruction pointer is generated in the back end of the processor.

9. The method of claim 6 wherein the exception is generated in the back end of the processor.

10. The method of claim 5, wherein the second parity bit is generated in a back end of the processor.

11. The method of claim 5, wherein the checking for the parity error in the first next instruction pointer using the first parity bit, and the checking for the parity error in the second next instruction pointer using the second parity bit are performed in the back end of the processor.

12. The method of claim 5, wherein the comparison of the first next instruction pointer and the second next instruction pointer is performed in the back end of the processor.

13. A processor for checking and correcting soft errors in next instruction pointer, comprising:
   a first parity bit generator for producing a first parity bit for a first next instruction pointer;
   a second parity generator for producing a second parity bit for a second next instruction pointer;
   a comparator to compare the first and second next instruction pointers; and
   a control logic coupled to the comparator and the first and second next instruction pointers to process the next instruction pointers.

14. The processor of claim 13, wherein the first parity bit generator is located in a front end of the processor.

15. The processor of claim 14, wherein a first next instruction pointer generator, coupled to the first parity bit generator, produces the first next instruction pointer.

16. The processor of claim 15, wherein the first next instruction pointer and the first parity bit are sent to a latch, coupled to the first parity bit generator, to stage the first next instruction pointer and the first parity bit through a pipeline in the processor.

17. A processor for checking and correcting soft errors in a first next instruction pointer and a second next instruction pointer where a first parity bit is generated for the first next instruction pointer, comprising:
   a first parity bit checker to check for a parity error in the first next instruction pointer;
   a parity bit generator for generating a second parity bit for the second next instruction pointer; and
   a second parity bit checker, coupled to the parity bit generator, to check for the parity error in the second next instruction pointer.

18. The processor of claim 17, further comprising:
   a comparator, coupled to a latch and the parity bit generator, to compare the first next instruction pointer and the second next instruction pointer to determine if both are equal.

19. The processor of claim 17, further comprising:
   a control logic, coupled to the first parity bit checker, the second parity bit checker, and the comparator, to perform at least one of
      no action,
      generate an exception, and
      flush a pipeline in the processor and then fetch a set of instructions using the second next instruction pointer.

20. The processor of claim 19, wherein the control logic generates the exception if at least one of
   the first next instruction pointer together with the first parity bit signal the parity error, and the second next instruction pointer together with the second parity bit signal the parity error, the first next instruction pointer together with the first parity bit do not signal the parity error, and the second next instruction pointer together with the second parity bit do not signal the parity error, and the first next instruction pointer does not equal the second next instruction pointer, and an instruction currently executing is not a branch instruction, and the first next instruction pointer together with the first parity bit do not signal the parity error, and the second next instruction pointer together with the second parity bit signal the parity error, and the first next instruction pointer does not equal the second next instruction pointer, and the instruction currently executing is the branch instruction.

21. The processor of claim 19, wherein the control logic flushes the pipeline in the processor and fetches the set of instructions using the second next instruction pointer if at least one of the first next instruction pointer together with the first parity bit signal the parity error, and the second next instruction pointer together with the second parity bit do not signal the parity error, and the first next instruction pointer does not equal the second next instruction pointer, and the first next instruction pointer together with the first parity bit do not signal the parity error, and the second next instruction pointer together with the second parity bit do not signal the parity error, and the first next instruction pointer does not equal the second next instruction pointer, and the instruction currently executing is the branch instruction.

22. The processor of claim 19, further comprising:

a next instruction pointer generator, coupled to the second parity bit generator, to produce the second next instruction pointer.

23. The processor of claim 22, wherein the first parity bit checker, the comparator, the next instruction pointer generator, the parity bit generator, the second parity bit checker, and the control logic are located in a back end of the processor.

* * * * *